United States Patent
Stewenius

(10) Patent No.: US 8,923,626 B1
(45) Date of Patent: Dec. 30, 2014

(54) IMAGE RETRIEVAL

(75) Inventor: Henrik C. Stewenius, Zurich (CH)

(73) Assignee: Google Inc., Mountain View, CA (US)

( * ) Notice: Subject to any disclaimer, the term of this patent is extended or adjusted under 35 U.S.C. 154(b) by 362 days.

(21) Appl. No.: 13/531,912

(22) Filed: Jun. 25, 2012

(51) Int. Cl.
G06K 9/68 (2006.01)

(52) U.S. Cl.
USPC .......................................................... 382/218

(58) Field of Classification Search
None
See application file for complete search history.

(56) References Cited

U.S. PATENT DOCUMENTS

| | | | |
|---|---|---|---|
| 7,991,232 B2 | 8/2011 | Iwamoto | |
| 8,031,914 B2 | 10/2011 | Zhang | |
| 8,073,818 B2 * | 12/2011 | Duan et al. | 707/687 |
| 8,352,465 B1 | 1/2013 | Jing et al. | |
| 8,452,059 B2 | 5/2013 | Tang et al. | |
| 8,625,907 B2 | 1/2014 | Zitnick et al. | |
| 2012/0054600 A1 | 3/2012 | McCurdy et al. | |
| 2012/0321193 A1 | 12/2012 | Ukil et al. | |
| 2013/0251266 A1 | 9/2013 | Nakagome et al. | |
| 2014/0105509 A1 * | 4/2014 | Dusberger et al. | 382/218 |

* cited by examiner

Primary Examiner — Vikkram Bali
(74) Attorney, Agent, or Firm — Fish & Richardson P.C.

(57) ABSTRACT

Methods, systems, and apparatus, including computer programs encoded on computer storage media, for obtaining image search results. One of the methods includes aligning each image in a collection of near duplicate images to a common coordinate frame. One or more visual words are determined in the common coordinate frame for each of the images in the collection of near duplicate images. A union of visual words is determined, wherein the union of visual words comprises determined visual words in the common coordinate frame. A posting list item that identifies the collection of near duplicate images is added to one or more corresponding posting lists, wherein each posting list identifies one or more collections of near duplicate images whose union of determined visual words have the particular visual word.

20 Claims, 5 Drawing Sheets

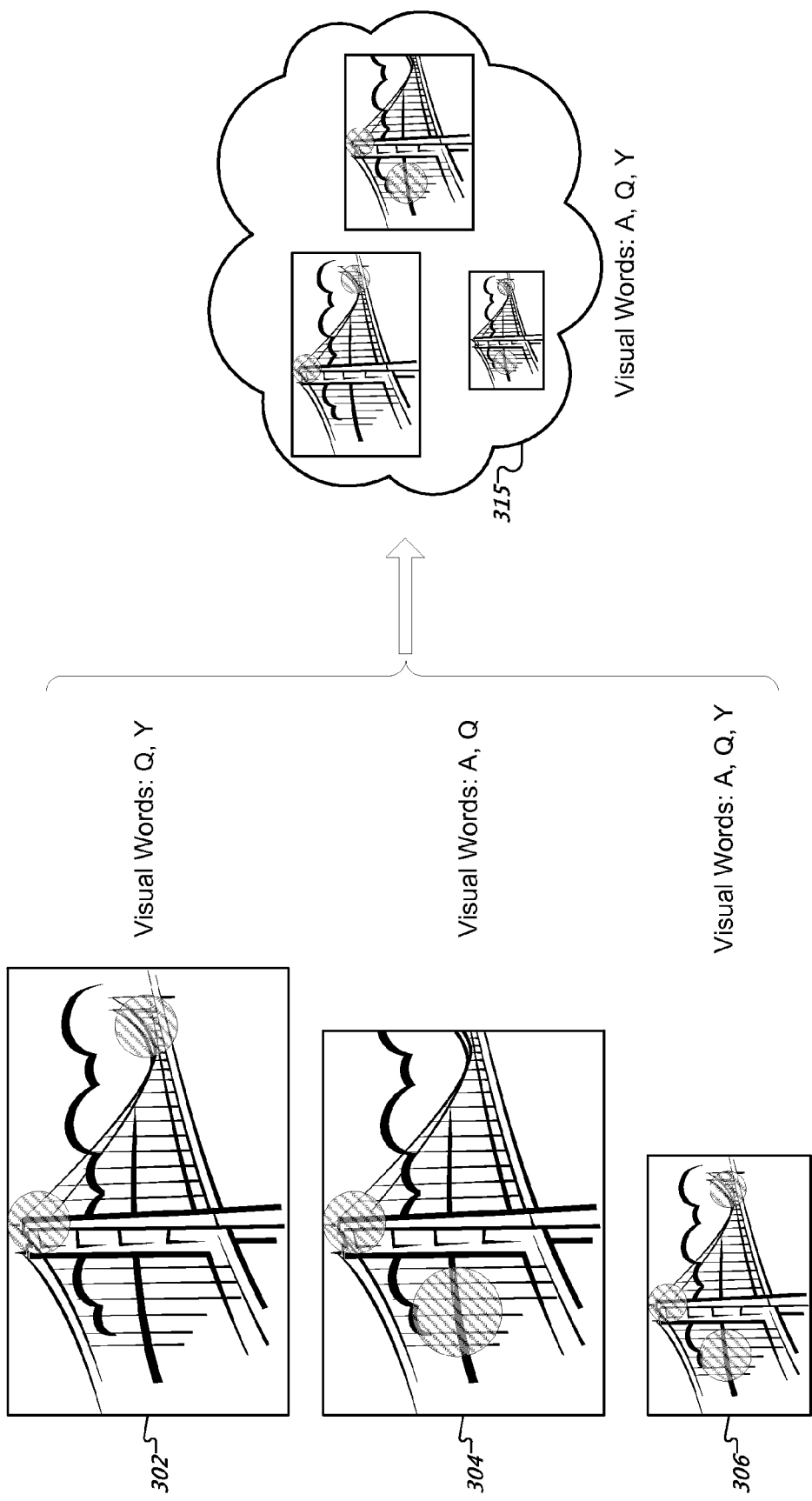

IMAGE RETRIEVAL

BACKGROUND

This specification relates to information retrieval.

Conventional information retrieval systems are used to identify a wide variety of resources, for example, images, audio files, web pages, or documents, e.g., news articles. Additionally, search results presented to a user that identify particular resources responsive to a query are typically ranked according to particular criteria.

SUMMARY

Image search systems can assign visual words to images; in this context, images may be said to have visual words, and one may refer to the visual words of an image. Image search systems can identify features of images and compute a feature vector for each of one or more regions of an image. Image search systems can quantize each computed feature vector into one or more corresponding visual words.

An image search system can improve image retrieval by clustering near-duplicate images into collections of near-duplicate images and indexing images by collections of near-duplicate images, rather than indexing the images individually. A collection of near-duplicate images can be indexed by visual words in a union of the visual words of all images in the collection. An image search system can then identify collections having a particular number of visual words in common with a query image as collections that match the query image.

In general, one innovative aspect of the subject matter described in this specification can be embodied in methods that include the actions of aligning each image in a collection of near-duplicate images to a common coordinate frame; determining one or more visual words in the common coordinate frame for each of the images in the collection of near-duplicate images; determining a union of visual words, wherein the union of visual words comprises the one or more visual words determined in the common coordinate frame; and adding a posting list item that identifies the collection of near-duplicate images to one or more corresponding posting lists, wherein each posting list corresponds to one of the determined visual words, and wherein each posting list identifies one or more collections of near-duplicate images whose union of determined visual words have the particular visual word. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. The actions include receiving a query image; determining one or more visual words for the query image; determining that the collection of near-duplicate images has at least a first threshold number of visual words in common with the query image; and computing a score for one or more images in the collection of near-duplicate images. Computing a score for one or more images in the collection of images comprises computing a similarity score using visual words of the query image and matching visual words of the union of determined visual words; and assigning the similarity score to each image in the collection of near-duplicate images. The first threshold number of visual words increases as the size of a candidate collection of near-duplicate images increases. The actions include determining that a second collection of near-duplicate images has at least a second different threshold number of visual words in common with the query image; and computing a score for one or more images in the second collection of near-duplicate images. Computing a score comprises computing a first score for each matching visual word between the query image and the collection of near-duplicate images based on a geometric mapping between visual words of the query image and visual words of the collection of near-duplicate images. Aligning each image in a collection of near-duplicate images to a common coordinate frame comprises selecting a reference image in the collection of near-duplicate images as the basis for the common coordinate frame; and determining an affine transformation between the reference image and each image of the collection of near-duplicate images. Determining one or more visual words in the common coordinate frame for each of the images in the collection of near-duplicate images comprises applying a corresponding affine transformation to each image in the collection of near-duplicate images; and determining visual words of each image according to coordinates in the common coordinate frame. The actions include clustering a plurality of images into one or more collections of near-duplicate images, wherein each cluster is no greater than a maximum size.

Particular embodiments of the subject matter described in this specification can be implemented so as to realize one or more of the following advantages. Indexing collections of near-duplicate images rather than individual images improves image retrieval performance without increasing retrieval time. Indexing by collections of near-duplicate images also takes advantage of the combined visual words of near-duplicate images, reducing the chance that a near-duplicate of a query image is not identified or that two near-duplicate images are treated inconsistently. Indexing by collections of near-duplicate images can also improve retrieval time by making posting lists shorter.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 3A is a diagram of determining a union of visual words for a collection of near-duplicate images.

Like reference numbers and designations in the various drawings indicate like elements.

DETAILED DESCRIPTION

Figure 1:
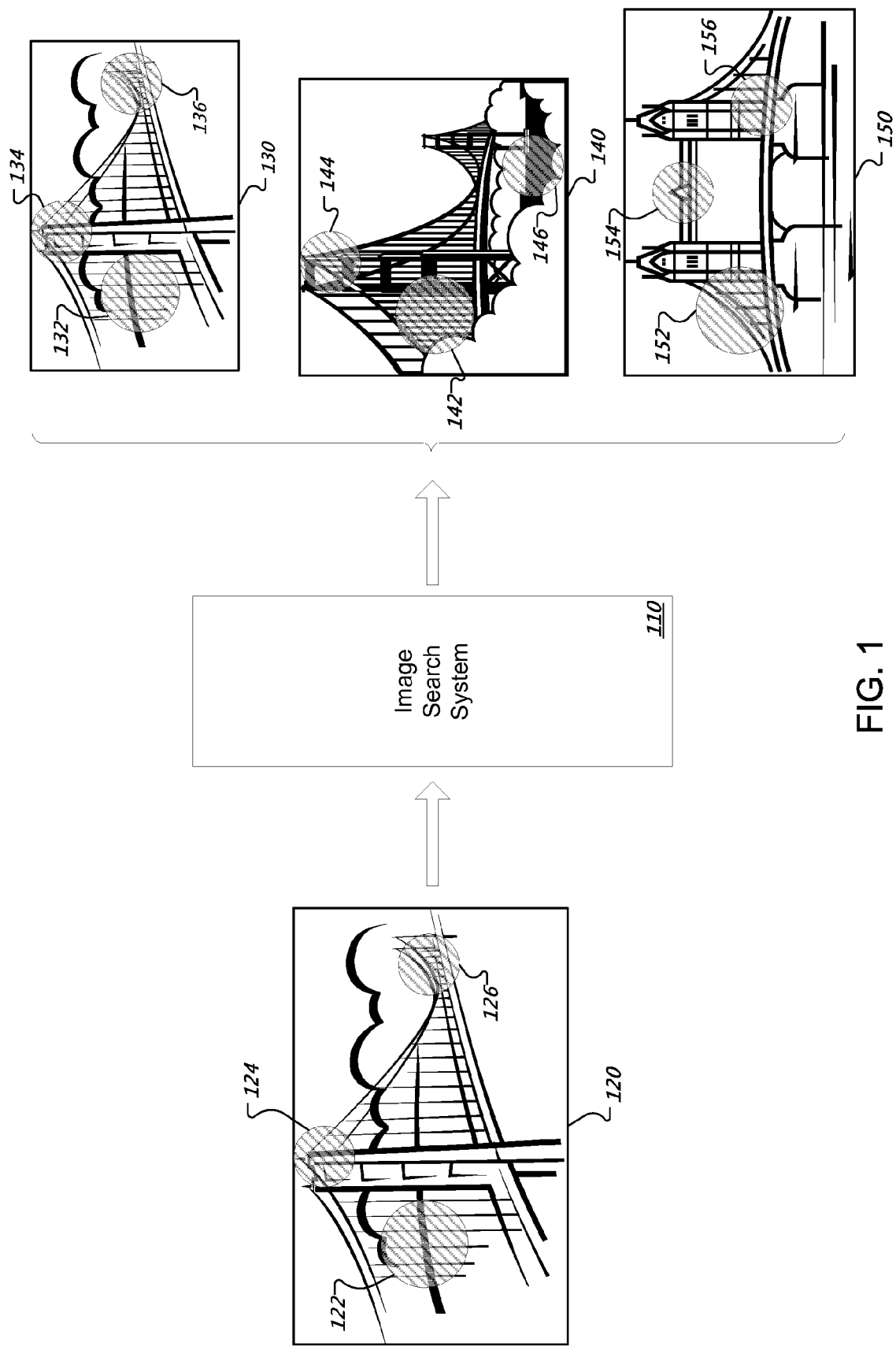
FIG. 1 illustrates the input and output of an example image search system.

FIG. 1 illustrates the input and output of an example image search system 110. The search system 110 takes as input a query image 120 and provides as output one or more image search results, e.g., results that each identify a corresponding result image 130, 140, 150 in response to the query image.

Generally, multiple search results will be presented together in a user interface presentation, e.g., a web page, each search result will include a thumbnail of the corresponding result image that the search result identifies as well as a link, e.g., a hyperlink, to the result image. The image search system 110 can order the image search results for presentation or other purposes by a measure of visual similarity to the query image 120. Thus, the image search system 110 can identify images that are visually similar to the query image 120.

For example, the system orders the images 130, 140, and 150 by visual similarity to the query image 120. Image 130 is a resized version of image 120 and is most visually similar to the query image 120 of the three provided images. Image 140 is an image of the same bridge depicted in image 130, but from a perspective different from that of the query image 120. Therefore, the image search system 110 determines that image 140 is less similar to query image 120 than image 130. The image search system 110 similarly determines that image 140 is more similar to the query image 120 than image 150.

The image search system 110 can compute a measure of similarity between a query image and other images by using data that characterizes feature regions identified in the images. In some implementations, the search system 110 identifies elliptical regions in each image as feature regions. For example, the system 110 can identify elliptical regions 122, 124, and 126 in the query image 120 as feature regions. Similarly, the system 110 can identify as feature regions elliptical regions 132, 134, and 136 of image 130; 142, 144, and 146 of image 140; and 152, 154, and 156 of image 150.

The system 110 can compute a feature vector from each feature region. A feature vector can be a vector where each element of the vector is a quantity that represents a feature value of a feature of the corresponding feature region. The system 110 can compute a similarity score between two images by computing a similarity measure between feature vectors computed from each image. The system 110 can then determine that images having feature vectors that are more similar according to the computed similarity measure are more visually similar than images having feature vectors that are less similar according to the computed similarity measure.

To simplify the comparison of feature vectors, the search system 110 can quantize the feature space of feature vectors into a finite number of cells, which can be referred to as "visual words." Then, for a given feature vector, the system 110 can determine to which of one or more visual words the feature vector should be assigned. The system 110 can determine to which of the cells of the feature space a particular feature vector belongs using an appropriate distance metric.

The system can then quantize each feature vector for a particular image into a corresponding visual word and assign the visual words to the particular image. The system can also associate with each visual word geometry information of the corresponding feature region. For example, the geometry information can include a position in the image, e.g., pixel coordinates, of the corresponding feature region and a scale value indicating a size of the feature region.

After assigning visual words to images, the system 110 can make a preliminary determination of image similarity between two images by computing how many visual words the two images have in common. The system 110 can thus save computation resources by computing a similarity score between two images only if the two images have a threshold number of visual words in common.

For example, the system 110 can determine that a feature vector computed from region 122 is assigned to visual word A, that the feature vector computed from region 124 is assigned to visual word B, and that the feature vector computed from region 126 is assigned to visual word C. The system 110 can similarly determine that feature vectors from feature regions 132, 134, and 136 of image 130 are also assigned to visual words A, B, and C, and can therefore determine that query image 120 and image 130 have three visual words in common. Similarly, the system 110 can determine that feature vectors computed from image 140 are assigned to visual words A, B, and D and determine that query image 120 and image 140 have two visual words in common. The system 110 can determine that feature vectors computed from image 150 are assigned to visual words A, E, and F and determine that query image 120 and image 150 have only one visual word in common.

In some implementations, the system 110 can index images in multiple posting lists. For each visual word in the feature space, the system can maintain a posting list of images that have been assigned the visual word at least once. The system can then scan posting lists for the visual words of a received query image in order to identify indexed images that have at least a threshold number of visual words in common with the query image.

Figure 2:
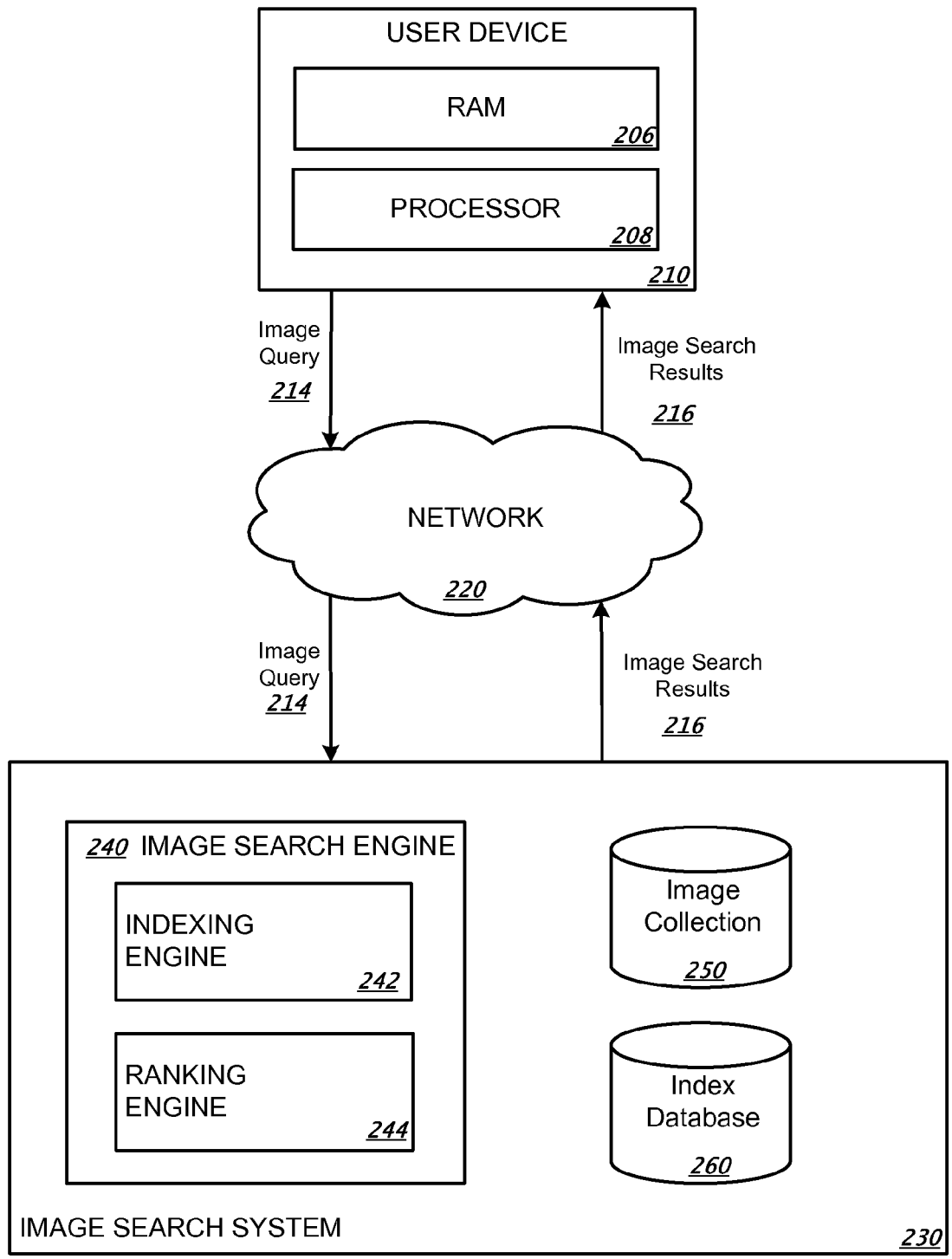
FIG. 2 illustrates an example image search system.

FIG. 2 illustrates an example image search system 230. The image search system 230 is an example of an information retrieval system in which the systems, components, and techniques described below can be implemented.

A user device 210 can be coupled to the image search system 230 through a data communication network 220. In general, the user device 210 transmits an image query 214 over the network 220 to the image search system 230. The image query 214 specifies a particular image, for example, by an image file or a resource locator, e.g., a uniform resource locators (URL), provided by the user device 210. The image search system 230 identifies images that satisfy the image query 214 and generates image search results 216. The image search system 230 transmits the image search results 216 over the network 220 back to the user device 210 for presentation to a user. Generally, the user is a person; but in certain cases, the user can be a software agent.

The user device 210 can be any appropriate type of computing device, e.g., mobile phone, tablet computer, notebook computer, music player, e-book reader, laptop or desktop computer, PDA (personal digital assistant), smart phone, a server, or other stationary or portable device, that includes one or more processors, e.g., processor 208, for executing program instructions, and random access memory, e.g., RAM 206. The user device 210 can include computer readable media that store software applications, e.g., a browser or layout engine, an input device, e.g., a keyboard or mouse, a communication interface, and a display device.

The network 220 can be, for example, a wireless cellular network, a wireless local area network (WLAN) or Wi-Fi network, a Third Generation (3G) or Fourth Generation (4G) mobile telecommunications network, a wired Ethernet network, a private network such as an intranet, a public network such as the Internet, or any appropriate combination of such networks.

The image search system 230 can be implemented as computer programs installed on one or more computers in one or more locations that are coupled to each other through a network, e.g., network 220. The image search system 230 includes a search engine 240, an image collection 250 and an index database 260. The index database 260 contains one or more indices of images in the image collection 250. The "indexed images" are images in the image collection 250 that are indexed by any of the indices in the image database 250.

When the image query 214 is received by the image search system 230, a search engine 240 identifies resources that satisfy the query 214. The image search system 230 identifies images in the image collection 250 that have a highest similarity score for an image specified by the image query 214.

The search engine 240 will generally include an indexing engine 242 that indexes images. In some implementations, the indexing engine maintains multiple posting lists in the index database 260. Each posting list is a list of images in the image collection 250 that have a same particular visual word.

The search engine 240 can identify resources that satisfy the image query 214.

The search engine 240 includes a ranking engine 244 that can rank identified resources. For example, the ranking engine 244 can identify indexed images that have at least a threshold number of visual words in common with the image specified by image query 214. The ranking engine 214 can then rank the identified images, e.g., by a computed similarity score.

The image search system 230 can respond to the image query 214 by generating image search results 216, which the system can transmit over the network 220 to the user device 210 in a form that can be presented on the user device 210, e.g., in a form that can be displayed in a web browser on the user device 210. For example, the image search results 216 can be presented in a markup language document, e.g., a HyperText Markup Language or eXtensible Markup Language document. The user device 210 renders the received form of the image search results 216, e.g., by rendering a markup language document using a web browser, in order to present the image search results 216 on a display device coupled to the user device 210.

Multiple image search results 216 are generally presented at the same time; although on a small display device the results may be presented one at a time. Each of the presented image search results can include titles, text snippets, images, links, or other information. Each image search result is linked to a particular resource, e.g., Internet addressable document. Selection of an image search result can cause a display program running on the user device 210 to request the resource associated with the image search result.

FIG. 3A is a diagram of determining a union of visual words for a collection of near-duplicate images. In general, an image search system can improve image retrieval by computing a union of visual words from each image in a collection of near-duplicate images and indexing the collection of near-duplicate images by the union of visual words. A union of visual words from each image in a collection of near-duplicate images includes all distinct visual words from images in the collection. In FIG. 3A, the images 302, 304, and 306 are considered near-duplicate images.

Images in a collection of images, e.g., image collection 250, can be different versions of the same image. In other words, the images are different versions of the same original pixels. An image can be a resized or rescaled version of another image. For example, image 306 is a smaller version of image 302. An image can also be a compressed version of another image, e.g., a compressed JPEG image computed from an uncompressed bitmap image. An image may be a cropped version of another image. For example, image 304 is a cropped version of image 302. An image may also have minor text or other minor alterations added.

In addition, images in a collection of images can be images of the same object or scene, e.g., different images of the Golden Gate Bridge or the Eiffel Tower that, while captured at different times by different cameras, a search system considers to be near-duplicates.

An image search system can organize such near-duplicate images into multiple collections of near duplicate images. The collections of near duplicate images can be determined in various ways, e.g., by conventional clustering algorithms that can cluster images according to image similarity.

Visual words computed from near-duplicate images may not always be the same. For example, image 302 has visual words Q and Y, while image 306 has visual words A, Q, and Y, even though visual word 306 is merely a smaller version of image 302. Similarly, image 304, a cropped version of image 302, has visual words A and Q. Image 304 has only one visual word in common with image 302.

If a received query image has three visual words, A, Q, Y, the three near-duplicate images 302, 304, and 306 may not be identified or may be treated inconsistently. For example, if the system requires three visual words for an image to be considered a matching image, only image 306 will be identified, even though images 302 and 304 are near-duplicates of image 306. Similarly, images 302, 304, and 306 may in fact be near-duplicates of the query image, but the search system may not retrieve any of the images, for example, if the retrieval threshold is four or more visual words.

The image search system can improve the retrieval performance by taking advantage of the collective information of near-duplicate images. Thus, instead of treating each of the near-duplicate images independently, the search system can combine visual words of the near-duplicate images into a union of visual words and treat the near-duplicate images as a single collection of near-duplicate images 315.

For example, the union of the visual words of images 302, 304, and 306 is A, Q, and Y. Therefore, the image search system can treat the collection of near-duplicate images 315 as a single unit with visual words A, Q, and, Y. A query image with visual words A, Q, and Y, which previously did not match three visual words of with images 302 and 304, will now match three visual words of the union of visual words from the collection of near-duplicate images 315. Thus, treating the collection of near-duplicate images 315 as a single unit reduces the possibility that an image that is similar to the query image is not retrieved or that near-duplicate images are treated inconsistently.

Because the number of visual words in a collection's union of visual words increases as the size of the collection increases, in some implementations the system enforces a size restriction when generating clusters of near-duplicate images. In other words, if the size of a particular cluster exceeds a threshold, the system can divide the cluster into two smaller clusters. The system can cluster the images so that each image in a large collection of images to assigned to exactly one cluster. Some clusters may have only a single image. The system can then treat each final cluster as a collection of near-duplicate images.

After determining that a collection of near-duplicate images matches a query image, the image search system can return all images in the collection of near-duplicate images as image search results. The system can compute a similarity score using visual words of the collection that match visual words of the query image, assigning the same similarity score to each image in the collection. Alternatively, the image search system can rank images in the collection by another measure, such as size, for example, if a user wants to find multiple sizes of a particular image.

Alternatively the image search system can return only a single representative image from the collection of near-duplicate images. The system can select a representative image in various ways, for example, selecting the largest image, or an image that is selected often by users.

The image search system can also perform an additional, more refined scoring step by computing a similarity score between the query image and each image in the collection of near-duplicate images. In some implementations, the system computes the more-refined similarity score using only visual words computed from each image, as opposed to all matching visual words for the collection of near-duplicate images.

In order to treat a collection of near-duplicate images as a single unit for retrieval, the image search system can index each collection of near-duplicate images according to the collection's union of visual words, rather than indexing images individually.

Figure 3B:
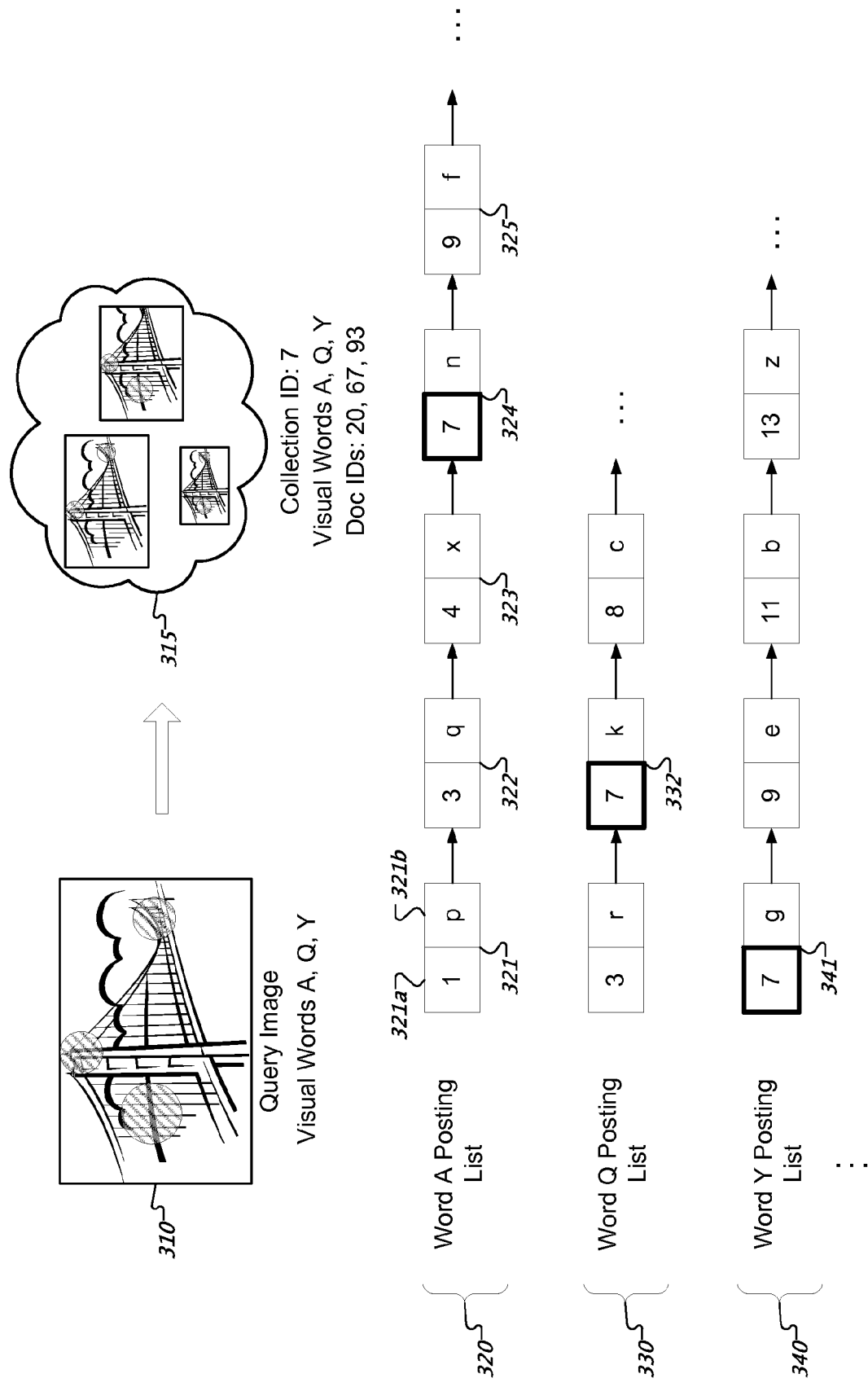
FIG. 3B is a diagram of multiple example posting lists.

FIG. 3B is a diagram of multiple example posting lists. Each posting list 320, 330, 340 shown in FIG. 3B includes a list of collections of near-duplicate images. Each collection of near-duplicate images indexed into a posting list has the same visual word among the union of visual words of the collection.

An example query image 310 has three visual words, A, Q, and Y. The example collection of near-duplicate images 315 also has visual words, A, Q, and Y, the union of the visual words of the images in the collection 315. The image search system has indexed the collection 315 by visual words in multiple posting lists, one for each visual word of the collection. The image search system traverses its posting lists to find collections of near-duplicate images that have at least a threshold number of visual words in common with the query image.

Each posting list 320, 330, 340 corresponds to exactly one visual word as defined by the system, e.g., as defined by a quantizer. The word A posting list 320 is a list of collections of near-duplicate images that have visual word A. The word Q posting list 330 is a list of collections of near-duplicate images that have visual word Q. The word Y posting list 340 is a list of collections of near-duplicate images that have visual word Y.

In the posting lists, collections of near-duplicate images are identified by collection identifiers. The collection identifiers can be, for example, values of a database key to a database, e.g., an index database, or file system identifiers. Images in a collection are further identified by document identifiers, e.g., document identifiers 20, 67, and 93, which can, for example, identify electronic image documents in a database, on a file system, or on the Internet.

For example, item 321 of posting list 320 includes collection identifier 321a with a value of "1", indicating that the collection of near-duplicate images identified by collection identifier "1" is a collection of near-duplicate images that has visual word A. Similarly, items 322, 323, 324, and 325 of the posting list 320 include collection identifiers "3", "4", "7", and "9", respectively, which indicates that corresponding collections also have visual word A.

A search system can maintain the posting lists in a sorted order by collection identifiers. Items in posting list 320 are sorted by increasing order of document identifiers, "1", "3", "4", "6", and "9". The posting lists can be maintained in a decreasing order of collection identifiers, or the posting lists can be sorted in some other way.

A search system can traverse the posting lists that correspond to visual words of the query image 310 to identify collections of near-duplicate images that have at least a threshold number of visual words in common with query image 310. For example, the system can determine that the collection 315, identified by the collection identifier "7," has at least three visual words in common with query image 310.

While the system is traversing the posting lists, the system can compare the number of matching visual words to a numerical threshold. If the number of matching visual words does not satisfy the threshold, the system can continue traversing the posting lists. If the number of matching visual words satisfies the threshold, the system can determine that the collection is a matching collection and stop the traversing.

In some implementations, the system can use a dynamic threshold based on the size of the image collection under consideration. As the size of a particular collection of near-duplicate images increases, the number of the visual words in the union of visual words also tends to increase. Thus, a collection with many near-duplicate images and many visual words is more likely to match a query image than a collection with fewer images and fewer visual words.

Accordingly, the image search system can use different thresholds when determining whether a collection of near-duplicate images is a match. For example, the system can require five matching visual words for a singleton collection, e.g., a collection with only one image, and the system can require eight matching visual words for collections with multiple images.

A search system can compute a score for a collection of near-duplicate images upon determining that the collection matches a query image. As mentioned above, the system can either compute a score for the entire collection of images using the union of visual words, or the system can compute a respective score for each of the images in the collection, using only the visual words of each individual image. The procedure for scoring based on visual words, described below, can be used for either scoring technique.

The search system can store further information in the posting lists to support scoring while traversing the posting list. Each posting list item for a visual word can, for example, include geometry data, e.g., a position and a scale value associated with the region or regions with which the visual word is associated in the image or images of the collection that have the visual word. For example, item 321 of posting list 320 can include geometry data 321b, which can specify a position and a scale value for visual word A assigned to the collection identified by collection identifier "1". The value "p" of geometry data 321b shown in FIG. 3 merely illustrates that the geometry data is different from geometry data of other items in the posting lists. The geometry data for visual words of the collection of near-duplicate images can be computed according to a common coordinate frame for images in the collection of near-duplicate images. Computing the common coordinate frame for images in a collection of near-duplicate images is described in more detail below with reference to FIG. 4.

The computed similarity score for a collection can be based on a measure of how well the visual words of the query image align with matched visual words of the matching collection under a particular geometric mapping. The system can define a variety of geometric mappings, including translation, scaling, rotation, skewing, in addition to other transformations.

The geometric mapping transforms coordinates of visual words from the query image into transformed coordinates. Matched visual words of the matching collection will be said to align with visual words of the query image if the coordinates of the matched visual words are close to the respective transformed coordinates or within a certain error threshold. Thus, visual words that are more closely aligned will result in a higher score than visual words that are less closely aligned.

In some implementations, the system searches for a geometric mapping that is of the form:

$$f(x,y)=[ax+b, cy+d],$$

where (x, y) are coordinates of visual words in the query image, and [ax+b, cy+d] are transformed coordinates. The system can thus determine a particular geometric mapping by determining values for a, b, c, and d that optimize the alignment between the visual words of the query image and the visual words of the collection or individual image, as the case may be. In some implementations, the system uses a Random Sample Consensus (RANSAC) algorithm to determine values for a, b, c, and d.

The system can compute a distance between coordinates of each matched visual word and each corresponding set of transformed coordinates. For each visual word for which the distance is within a particular error threshold the system can increase the similarity score for the collection by a particular amount, e.g., 1. For example, the system can assign a point to each aligned visual word of a matched collection. If three out of four matched visual words align with visual words of the query image, the matched collection can be assigned a similarity score of 3.

The system can also adjust the score based on how closely the visual words of the query and target are aligned, giving a higher score for visual words that are more closely aligned. In some implementations, the system assigns a value between 0 and 1 for each visual word based on the computed distance. The system can assign 1 to a perfectly aligned visual word, 0 to a visual word with a computed distance beyond the error threshold, and a proportional value between 0 and 1 for distances between 0 and the error threshold. In some implementations, the error threshold depends on the scale value associated with the visual word, with visual words of larger regions having a larger error threshold than visual words of smaller regions.

For example, an example query image has three visual words, each having particular example coordinates in the image as follows:

$A_q$: (50, 100),
$Q_q$: (100, 200),
$Y_q$: (400, 90).

After traversing the posting lists, a matching collection is encountered that has three visual words in common with the query image with the following example coordinates:

$A_m$: (60, 100),
$Q_m$: (116, 200),
$Y_m$: (413, 90).

Because this geometry data is stored in the posting lists, the system can now compute a similarity score for the matched collection using the geometry data. The system can search for a geometric mapping between the visual words of the query image 310 and the matched collection, or:

(50, 100) to (60, 100),
(100, 200) to (116, 200),
(400, 90) to (413, 90).

Given an error threshold of 10 pixels, one possible mapping is a translation of 10 pixels along the first dimension. In other words, the parameters of the transformed coordinates would be a=1, b=10, c=1, d=0, resulting in transformed coordinates:

$A_t$: (60, 100),
$Q_t$: (110, 200),
$Y_t$: (410, 90).

The system can compute distances between the transformed coordinates and the coordinates of visual words of the matched collection and assign scores based on the alignment of visual words. If the error threshold is 10 pixels and the matched collection has three aligned visual words, the system can, for example, assign a score of 3. In contrast, if the error threshold is 5 pixels, the matched collection would have only two aligned visual words.

The computed distances can also affect the score for each aligned visual word. For example, visual word $A_m$ can be said to be perfectly aligned with the transformed coordinates because the computed distance is zero. Thus, the system can assign a maximum score to visual word $A_m$, e.g., 1. The computed distance for visual word $Q_m$ is 6, and thus the system can assign a lower score to visual word $Q_m$, e.g., 0.4, than to visual word $A_m$. If the error threshold were 5 pixels, the system could instead assign a score of 0 to visual word $Q_m$.

Figure 4:
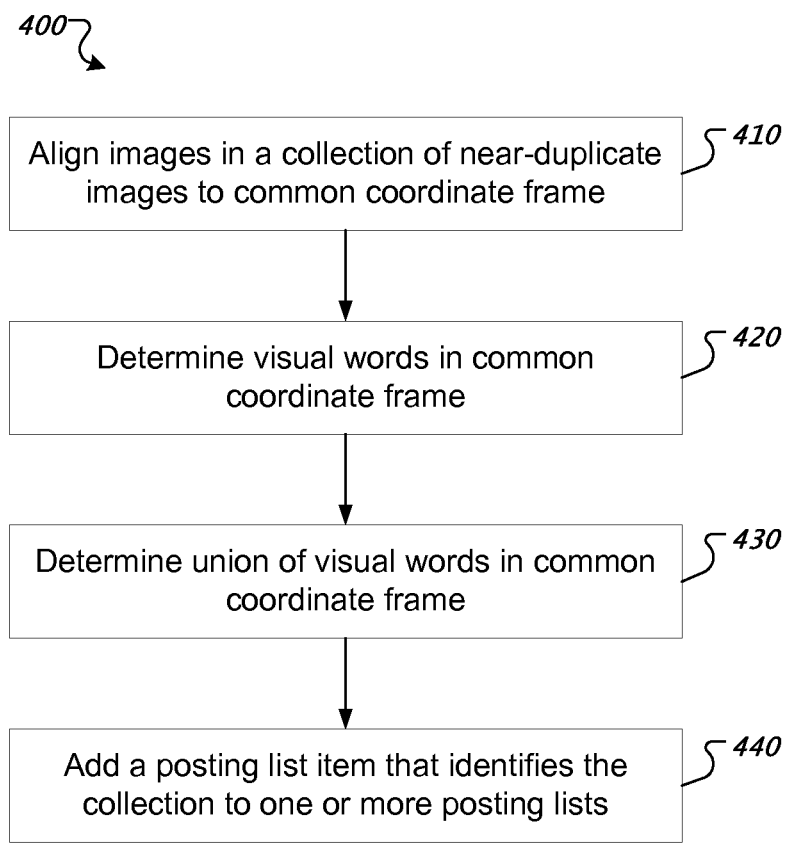
FIG. 4 is a flow chart of an example process for indexing collections of near-duplicate images.

FIG. 4 is a flow chart of an example process 400 for indexing collections of near-duplicate images. The process 400 can be performed by a component of a search system, for example, indexing engine 242 or ranking engine 244 (FIG. 2), implemented as one or more computer programs installed on one or more computers in one or more locations. The process 400 will be described as being performed by a system of one or more computers.

The system aligns images in a collection of near-duplicate images to a common coordinate frame (410). Because near-duplicate images can be cropped or rescaled versions of another image, corresponding visual words, e.g., visual words that represent the same image features, can have different pixel coordinates. The system can thus align the images to a common coordinate frame to ensure that visual words representing the same image features have corresponding pixel coordinates. Therefore, the system can first define a common coordinate frame and align all images in the collection of near-duplicate images to the common coordinate frame. The system can therefore ensure that corresponding visual words have corresponding pixel coordinates in the common coordinate frame. In some implementations, the system selects a reference image in the collection of images as the basis for the common coordinate frame. The system can then align each image in the collection by determining an affine transformation between the image and the reference image. The affine transformation for each image in the collection maps the coordinate frame of the collection to the features of the image.

The system determines visual words in the common coordinate frame (420). The pixel coordinates of each non-reference image of the collection can be transformed into coordinates in the common coordinate frame by applying a corresponding affine transformation, e.g., the affine transformation that aligned the image with the reference image. The system can then compute visual words for each image using pixel coordinates of the common coordinate frame.

The system determines a union of visual words in the common coordinate frame (430). The system adds a posting list item that identifies the collection to one or more posting lists (440). As mentioned above with reference to FIG. 3B, the posting list item includes a collection identifier for the collection of near-duplicate images. The posting list item can also include geometry data and other data, as described above.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
aligning each image in a collection of near-duplicate images to a common coordinate frame;
determining one or more visual words in the common coordinate frame for each of the images in the collection of near-duplicate images;
determining a union of visual words, wherein the union of visual words comprises the one or more visual words determined in the common coordinate frame; and
adding a posting list item that identifies the collection of near-duplicate images to one or more corresponding posting lists, wherein each posting list corresponds to one of the determined visual words, and wherein each posting list identifies one or more collections of near-duplicate images whose union of determined visual words have the particular visual word.

2. The method of claim 1, further comprising:
receiving a query image;
determining one or more visual words for the query image;
determining that the collection of near-duplicate images has at least a first threshold number of visual words in common with the query image; and
computing a score for one or more images in the collection of near-duplicate images.

3. The method of claim 2, wherein computing a score for one or more images in the collection of images comprises:
computing a similarity score using visual words of the query image and matching visual words of the union of determined visual words; and
assigning the similarity score to each image in the collection of near-duplicate images.

4. The method of claim 2, wherein the first threshold number of visual words increases as the size of a candidate collection of near-duplicate images increases.

5. The method of claim 2, further comprising:
determining that a second collection of near-duplicate images has at least a second different threshold number of visual words in common with the query image; and
computing a score for one or more images in the second collection of near-duplicate images.

6. The method of claim 2, wherein computing a score comprises computing a first score for each matching visual word between the query image and the collection of near-duplicate images based on a geometric mapping between visual words of the query image and visual words of the collection of near-duplicate images.

7. The method of claim 1, wherein aligning each image in a collection of near-duplicate images to a common coordinate frame comprises:
selecting a reference image in the collection of near-duplicate images as the basis for the common coordinate frame; and
determining an affine transformation between the reference image and each image of the collection of near-duplicate images.

8. The method of claim 7, wherein determining one or more visual words in the common coordinate frame for each of the images in the collection of near-duplicate images comprises:
applying a corresponding affine transformation to each image in the collection of near-duplicate images; and
determining visual words of each image according to coordinates in the common coordinate frame.

9. The method of claim 1, further comprising:
clustering a plurality of images into one or more collections of near-duplicate images, wherein each cluster is no greater than a maximum size.

10. A system comprising:
one or more computers and one or more storage devices storing instructions that are operable, when executed by the one or more computers, to cause the one or more computers to perform operations comprising:
aligning each image in a collection of near-duplicate images to a common coordinate frame;
determining one or more visual words in the common coordinate frame for each of the images in the collection of near-duplicate images;
determining a union of visual words, wherein the union of visual words comprises the one or more visual words determined in the common coordinate frame; and
adding a posting list item that identifies the collection of near-duplicate images to one or more corresponding posting lists, wherein each posting list corresponds to one of the determined visual words, and wherein each posting list identifies one or more collections of near-duplicate images whose union of determined visual words have the particular visual word.

11. The system of claim 10, wherein the operations further comprise:
receiving a query image;
determining one or more visual words for the query image;
determining that the collection of near-duplicate images has at least a first threshold number of visual words in common with the query image; and
computing a score for one or more images in the collection of near-duplicate images.

12. The system of claim 11, wherein computing a score for one or more images in the collection of images comprises:
computing a similarity score using visual words of the query image and matching visual words of the union of determined visual words; and
assigning the similarity score to each image in the collection of near-duplicate images.

13. The system of claim 11, wherein the first threshold number of visual words increases as the size of a candidate collection of near-duplicate images increases.

14. The system of claim 11, wherein the operations further comprise:
determining that a second collection of near-duplicate images has at least a second different threshold number of visual words in common with the query image; and
computing a score for one or more images in the second collection of near-duplicate images.

15. The system of claim 11, wherein computing a score comprises computing a first score for each matching visual word between the query image and the collection of near-duplicate images based on a geometric mapping between visual words of the query image and visual words of the collection of near-duplicate images.

16. The system of claim 10, wherein aligning each image in a collection of near-duplicate images to a common coordinate frame comprises:
- selecting a reference image in the collection of near-duplicate images as the basis for the common coordinate frame; and
- determining an affine transformation between the reference image and each image of the collection of near-duplicate images.

17. The system of claim 16, wherein determining one or more visual words in the common coordinate frame for each of the images in the collection of near-duplicate images comprises:
- applying a corresponding affine transformation to each image in the collection of near-duplicate images; and
- determining visual words of each image according to coordinates in the common coordinate frame.

18. The system of claim 10, wherein the operations further comprise:
- clustering a plurality of images into one or more collections of near-duplicate images, wherein each cluster is no greater than a maximum size.

19. A non-transitory computer-readable medium storing software comprising instructions executable by one or more computers which, upon such execution, cause the one or more computers to perform operations comprising:
- aligning each image in a collection of near-duplicate images to a common coordinate frame;
- determining one or more visual words in the common coordinate frame for each of the images in the collection of near-duplicate images;
- determining a union of visual words, wherein the union of visual words comprises the one or more visual words determined in the common coordinate frame; and
- adding a posting list item that identifies the collection of near-duplicate images to one or more corresponding posting lists, wherein each posting list corresponds to one of the determined visual words, and wherein each posting list identifies one or more collections of near-duplicate images whose union of determined visual words have the particular visual word.

20. The computer-readable medium of claim 19, wherein the operations further comprise:
- receiving a query image;
- determining one or more visual words for the query image;
- determining that the collection of near-duplicate images has at least a first threshold number of visual words in common with the query image; and
- computing a score for one or more images in the collection of near-duplicate images.

* * * * *